April 2, 1957 F. B. BERGER 2,787,188
OPTICAL CROSS-CORRELATOR
Filed July 31, 1953 2 Sheets-Sheet 1
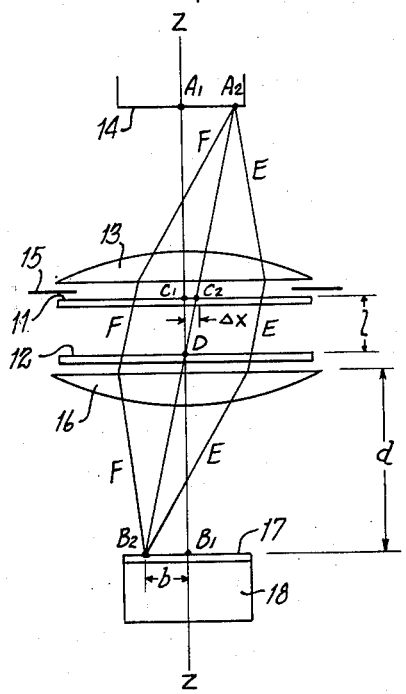
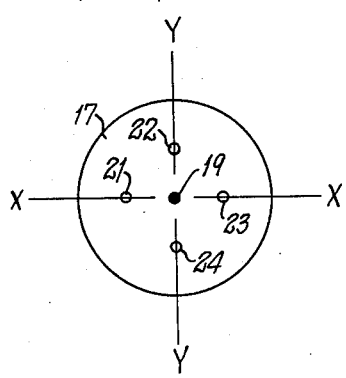
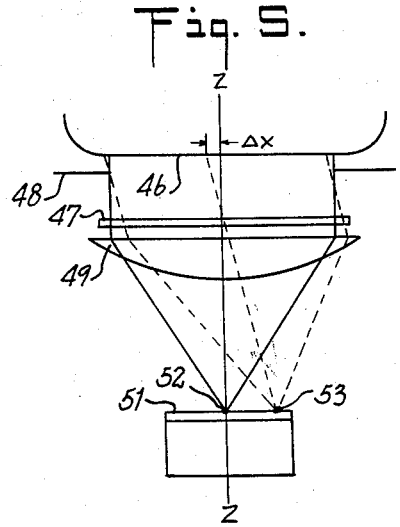
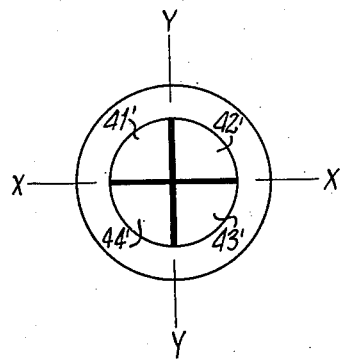
INVENTOR.
FRANCE B. BERGER
BY
ATTORNEY

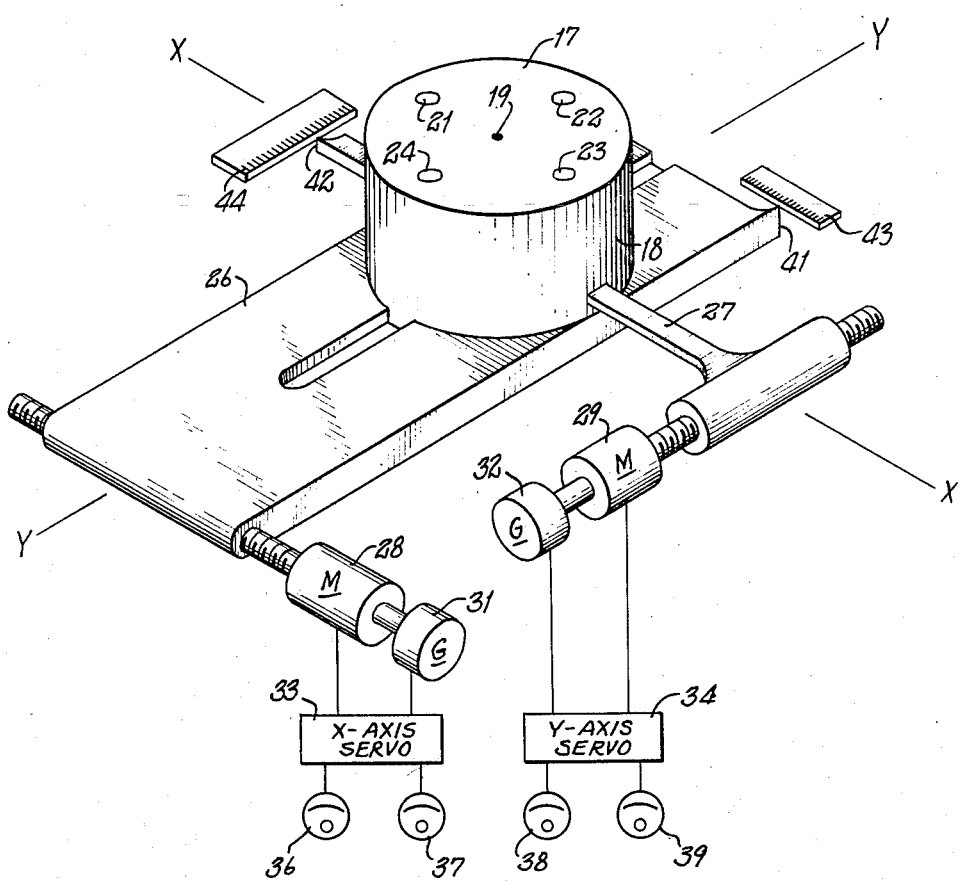

United States Patent Office 2,787,188
Patented Apr. 2, 1957

2,787,188
OPTICAL CROSS-CORRELATOR

France B. Berger, Pleasantville, N. Y., assignor to General Precision Laboratory Incorporated, a corporation of New York Application July 31, 1953, Serial No. 371,660

6 Claims. (Cl. 88—14)

This invention relates to optical cross-correlators and more particularly to optical devices for finding the degree of likeness of two transparencies representing two sets of relationships.

In the representation of a relationship of the form $T = f(x, y)$ by a transparency or film, the location of a point on the transparency can be represented in rectangular coordinates by $x$ and $y$, and the transparency of the material at that point represented by T. There are occasions when two such transparencies, similar but not identical, are to be superimposed in that relative position in which they are most nearly alike. This matching operation is in general termed correlation or more specifically cross-correlation, and as a special case when the two transparencies are substantially identical except for translational displacement, the operation is termed autocorrelation.

Among occasions requiring this matching operation there is the laboratory comparison of a sample aerial photograph with a standard aerial photograph, in order to estimate the point in space from which the sample photograph was taken. Another use for this matching operation is in the comparison of an aircraft radar plan position indicator, hereinafter termed PPI, presentation of terrain with an aerial photograph of presumably the same terrain for its identification or for measurement of the position of the aircraft when the picture was taken. Still another use in the comparison of a television picture with a motion picture film. In all three of these uses of the matching operation it may be said that one illuminated picture, either externally illuminated as a transparency or self-illuminated as a luminous picture, is compared or matched with another picture.

When two transparencies, or a transparency and a luminous picture, are identical and are superimposed, if they are either both positives or both negatives and if they are perfectly matched they will allow a maximum total quantity of light to pass through them, while in any other relative position in which they are less than perfectly matched they will allow less light to pass. On the other hand, if one is positive and the other is negative and they are perfectly matched they will complement each other and minimum light will pass through them while in any other position, of imperfect matching, more light will pass through.

The dissimilarity of two transparencies, or of a PPI presentation or other self-illuminated picture and a transparency may be of three general types according to the kind of mismatch when superimposed: One transparency may be bodily shifted parallel to the other in some direction; one may be relatively rotated about an axial point; or there may be a difference in scale between the two. The present invention provides a device primarily for the quantitative comparison of two such plane representations when the mismatch is of the first described kind, a translatory mismatch. By an extension of the use of the device mismatches of the second and third kinds also can be sensed.

The invention provides a condensing lens by which light, after passing in parallel rays between two transparencies, or between a self-luminous picture and a transparency, is condensed to a focal point upon a plane table. By measurement of the position, character and intensity of the light upon the plane table the character and amount of the mismatch of the two objects may be deduced and measured. By the addition of light-sensitive cells these results may be indicated electrically, or by means of a camera a permanent record may be made of the appearance of the plane table. By the further addition of servomechanisms the two objects being cross-correlated may be automatically brought into the closest correlation of which they are capable.

The principal purpose of this invention is to provide an optical device for the cross-correlation of two similar objects at least one of which is a transparency, for various relative positions of the objects.

Another purpose of this invention is to provide an optical device for the cross-correlation of two similar parallel transparencies with regard to the translation of one parallel to the other.

Still another purpose of this invention is to provide an optical device for the cross-correlation of a cathode ray tube PPI presentation with a similar transparency parallel thereto with regard to their mutual rotation.

Still another purpose of this invention is to provide an optical device for the cross-correlation of two parallel similar maps, one map being transparent and the other map being either transparent or luminous, when the two maps have different scales.

A further understanding of this invention may be secured from the detailed description and the drawings, in which:

Figure 1 diagrammatically illustrates an optical system employing this invention.

Figure 2 illustrates the plan of the image plane table of Fig. 1.

Figure 3 illustrates a circuit and associated mechanical equipment for the automatic adjustment of the plane table.

Figure 4 illustrates the plan of an image plane table for alternative use.

Figure 5 illustrates the use of a cathode ray tube face in place of one of the transparencies of Fig. 1.

Referring now to Fig. 1, two transparencies 11 and 12 are positioned in parallel planes, one being superimposed upon the other but separated by the distance $l$ between planes. Parallel light is applied to the transparency 11 by a collimating lens 13 from a light source 14, the focal distance between lens 13 and source 14 being such that light from any point of the source is collimated over the area of the transparency 11. A mask 15 is inserted to limit and define the field of illumination. A condensing lens 16 having a focal length $d$ collects all of the light which has passed through both transparencies and condenses it to points in a plane 17.

The light source 14 is a plane which in this example, is evenly luminous. However, for some purposes a non-uniform light plane might be desired as, for example, when weighting is to be applied to the correlation data. This variability of the light source area may be effected either by control of the light plane itself or by application of a variable density light filter close to either plane 14 or plane 17. In a different kind of data weighting a controlled density light filter could be applied in the plane of the mask 15 to weight "map" areas selectively.

Pairs of points in the planes 14 and 17 therefore constitute conjugate focal points of the lens system. Each point in the light source plane 14 illuminates all parts of the transparencies 11 and 12 with light which passes between the lenses in parallel rays, and each point in the transparencies is illuminated by all points of the light source.

The two transparencies may be two aerial photographic positive prints on film, so processed photographically that the amounts of light transmitted through the several portions of each film are in proportion to the respective amounts of light reflected from the object map to the camera which took the picture. They may alternatively be any other transparencies having a degree of similarity. The two photographs selected as examples are of the vertical type and are of generally the same terrain, at the same range and scale, and without relative rotation. However, it is assumed for present purposes that the camera was slightly displaced horizontally in taking the pictures, so that the terrain limits are slightly different in the two pictures.

Although this example employs two transparencies which are specifically described, they are merely examples of a general class of transparency which is generally described as a partly transparent plane which exhibits a planar variation of transparency of form.

$$T_1 = f(x, y) \quad (1)$$

The two transparencies may follow two different but related or similar laws, so that if one is described mathematically as above, the other may exhibit the function $$T_2 = g(x, y) \quad (2)$$

Obviously in place of positive transparencies negative transparencies may be used in which case the opacity, O, is substituted for T in the relations.

If the transparency 11 is positioned above transparency 12 with their edges parallel and superimposed, the light emanating from the luminous point $A_1$ on the axial line Z—Z will illuminate all parts of transparency 11, will pass in rays parallel to axis Z—Z to transparency 12, and will be concentrated at $B_1$ on the axis in plane 17. The intensity of this light will represent the average degree to which the transparency 11 matches transparency 12, taking into consideration all of its area.

Let it be supposed that there is some other position of the transparency 11 with relation to transparency 12, in which there is best matching, that is, in which the greatest amount of light will be transmitted by light parallel to the axis to lens 16, averaged over the entire area. Also let it be supposed that the required amount of Y-axis shift to accomplish this result is zero, and the amount of X-axis shift constitutes a displacement of the upper transparency a distance of $\Delta X$ to the left. The point $C_2$ is thus shifted by a distance of $\Delta X$ to the axis Z—Z, and the light at the point $B_1$ in plane 17 becomes brighter than before.

In place of bodily shifting the transparency 11 the image plane 17 can be inspected to ascertain the brightest spot thereon. In the present instance this spot will be at $B_2$, defined as the point on which light falls which has passed through $C_2$ and the point D on the axis Z—Z in transparency 12. This light has originated in some point $A_2$ of source 14. Assuming that the optical center of the lens is close to the point D in the surface 12, so that the distance $DB_1$ is approximately $d$, then the relation between $\Delta X$ and the distance $b$ between $B_1$ and $B_2$ in the focal plane is $$\frac{b}{d} = \frac{\Delta X}{l} \quad (3)$$

because the two triangles $C_1C_2D$ and $B_1B_2D$ are similar. All parts of the transparency 12 are illuminated by rays, such as rays E and F, parallel to $C_2D$ which have originated at $A_2$ and which converge to a focus at $B_2$. Therefore, the illumination of this point truly represents the correspondence of transparency 11 with transparency 12 after a shift of $\Delta X$.

In like manner, every other point on the image plane 17 represents by the brightness of its illumination the degree of correspondence of the two transparencies when relatively displaced by some amount, and the quantitative relation between the position of the image point and the putative displacement of the transparencies is given by Equation 3. Thus it is not necessary to shift either transparency to ascertain their relative position for maximum correlation, but merely to inspect the image plane 17 for the spot of maximum brightness. Around the brightest spot, such as $B_2$, the intensity of illumination will in general decrease as the distance from the spot increases.

This fact of gradation of illumination from the brightest spot forms the basis for use of phototubes to receive the light and for the use of automatic mechanism to move one of the transparencies until the light spot is centered at $B_1$. One way in which such automatic operation may be instrumented is to employ four phototubes, two in the X-axis at equal distances on either side of the Z—Z axis, and the other two in the Y-axis at equal distances on either side of the Z—Z axis. The image plane is opaque and is provided with four ports, with a phototube behind each port.

In Fig. 1 these phototubes are located in an enclosure 18, and the plan of the image plane screen is indicated in Fig. 2 with the Z-axis intersection at 19 and the four ports 21, 22, 23 and 24 positioned on the X and Y axes. If an automatic device is employed to move the transparency in the X and Y axes, this device can be controlled by conventional X-axis and Y-axis servomechanisms which are in turn controlled by the phototubes.

An example of such an automatic device with associated servomechanisms and phototubes is schematically indicated in Fig. 3. The focal plane table 17 and enclosure 18 are supported on a frame which includes two orthogonally sliding plates or bars 26 and 27. The table is moved in the X-axis direction by the plate 26, and the table is moved in the Y-axis direction by the sliding bar 27. The plate 26 and bar 27 are moved by motors 28 and 29 respectively, which with their feedback generators 31 and 32 and associated servoamplifiers and comparators 33 and 34 constitute position servomechanisms. The servomechanisms are operated by differential signals from the X-axis phototubes 36 and 37, which are positioned below ports 21 and 23 of table 17, and by differential signals from the Y-axis phototubes 38 and 39, which are positioned below ports 22 and 24 of table 17.

In operation, the table 17 is moved in the X- and Y-directions until equal signals are received by the X-axis phototubes 36 and 37, and also equal signals are received by the Y-axis phototubes 38 and 39. The brightest spot on the table will then be equidistant from all of the ports 21, 22, 23 and 24 and will therefore be at 19 in the center of table 17. The positional displacements in the X- and Y-axes then represent $\Delta X$ as defined in Fig. 1, and the corresponding $\Delta Y$. These displacements are measured by the indications of the indexes 41 and 42 fastened to the plate 26 and bar 27 and read on scales 43 and 44.

Other arrangements of phototubes are obviously possible, including the use of 3, 5 or more phototubes and ports arranged in a circle concentric with the point 19. In place of ports, wedge-shaped areas may be employed, as illustrated in Fig. 4 for 4 phototubes at 41', 42', 43' and 44'. Each area effectively integrates the light falling on it, thus smoothing the phototube response and reducing inaccuracies caused by normal variations in the transmissions of the transparencies.

If instead of one of the transparencies 11 a self-luminous plan position indicator display of the radar type is employed, the geometry of the device and the manner of its operation remain substantially as described. Such an arrangement is shown in Fig. 5. The cathode ray tube face 46 displays a PPI pattern. A transparency such as a positive film 47 is placed substantially parallel to face 46 with intermediate correction for the convexity of the tube face if desired. A mask 48 is inserted to define the field. A focusing lens 49 is positioned to collect the parallel rays of light passing through the transparency 47 and to focus them on the plane 51. If the two pictures are in exact registration the brightest spot will be at 52, while if they are not in registration the brightest spot will be focused at some other point 53 which is displaced from 52 by a distance and in a direction indicating the amount of misregistration.

If a rotational displacement of one transparency relative to the other transparency (or to the PPI face) exists about any axis, it is obviously resolvable into a translatory displacement and a rotational displacement about the central axis, heretofore termed the Z—Z axis. Such a rotational displacement will reduce the relative intensity of the brightest spot in the image plane in the case of visual operation, and will reduce the magnitude of the error signal when phototubes are employed. The rotational displacement may easily be eliminated manually by rotating one of the films relative to the other for brightest output or maximum error signal before measuring the translational displacement.

Difference in scale of the two transparencies likewise causes reduced brightness of visual signal and reduced phototube error signal, and is corrected by manual change of scale before measuring the translational displacement. When a PPI display is employed, the scale of its picture can be changed by cathode ray tube adjustments normally provided. When two transparencies are employed, one can be optically projected to the proper increased or decreased scale on a ground glass plate which then serves in place of the PPI display face 46 in Fig. 5. The other transparency is then positioned in the place of transparency 47, and the translational operation may be effected as described.

What is claimed is:

1. An optical cross-correlator for indicating the amount of instantaneous parallel mismatch between a pair of plane images positioned in spaced parallel relation, means for illuminating one of said plane images, projecting parallel light rays in the space between said images and transmitting the resultant illumination through the other of said plane images, a condensing lens positioned adjacent the other of said plane images on the side thereof which is remote from said one plane image, a light receiving surface including at least three light sensitive electrical means positioned in the focal plane of said condensing lens, motive means providing relative translatory parallel motion between at least one of said plane images and said light receiving surface, servo means actuated by the differential outputs of said light sensitive electrical means for actuating said motive means in such direction as to reduce the differential outputs of said light sensitive means to a minimum, and means operated by said motive means for indicating the amount of parallel mismatch between said pair of plane images.

2. An optical cross-correlator for indicating the amount of instantaneous parallel mismatch between an illuminated image and a partly transparent image positioned in spaced parallel relation comprising, a condensing lens positioned adjacent said partly transparent image on the side thereof which is remote from said illuminated image for receiving and condensing the light transmitted from said illuminated image through said partly transparent image, a light receiving member including at least three light sensitive electrical means positioned in the focal plane of said condensing lens, motive means providing relative translatory parallel motion between said light receiving member and said partly transparent image, servo means actuated by the differential outputs of said light sensitive electrical means for actuating said motive means in such direction as to reduce the differential outputs of said light sensitive means to a minimum, and means operated by said motive means for indicating the amount of parallel mismatch between said illuminated image and said partly transparent image.

3. An optical cross-correlator for indicating the amount of instantaneous parallel mismatch between a pair of films each bearing similar partly transparent film images and positioned in spaced parallel relation comprising, a planar light source positioned to transmit the light produced thereby through said pair of films, a collimating lens positioned between said light source and said pair of films whereby the illumination produced by each point on said planar light source is passed through the entire areas of said pair of films in parallel rays, a condensing lens means collecting the light transmitted through said films and focusing said light in a focal plane, a light receiving member including at least three light sensitive electrical means positioned in the focal plane of said condensing lens, motive means providing relative translatory parallel motion between said light receiving member and at least one of said films, servo means actuated by the differential outputs of said light sensitive means for actuating said motive means in such direction as to reduce the differential outputs of said light sensitive means to a minimum, and means operated by said motive means for indicating the amount of parallel mismatch between said pair of film images.

4. An optical cross-correlator for indicating the amount of instantaneous parallel mismatch between a pair of plane images positioned in spaced parallel relation, means for illuminating one of said plane images, projecting parallel light rays in the space between said images and transmitting the resultant illumination through the other of said plane images, a condensing lens positioned adjacent the other of said plane images on the side thereof which is remote from said one plane image, a light receiving surface including at least three light sensitive electrical means positioned in the focal plane of said condensing lens, means for translating said light receiving surface in the focal plane of said condensing lens, servo means actuated by the differential outputs of said light sensitive means for actuating said translating means in such a direction as to reduce the differential outputs of said light sensitive means to a minimum, and scalar means on said translating means for indicating the amount of parallel mismatch between said pair of plane images.

5. An optical cross-correlator for indicating the amount of instantaneous parallel mismatch between an illuminated image and a partly transparent image positioned in spaced parallel relation comprising a condensing lens positioned adjacent said partly transparent image on the side thereof which is remote from said illuminated image for receiving and condensing the light transmitted from said illuminated image through said partly transparent image, a light receiving member including at least three light sensitive electrical means positioned in the focal plane of said condensing lens, means for translating said light receiving member in the focal plane of said condensing lens, servo means actuated by the differential outputs of said light sensitive means for actuating said translating means in such a direction as to reduce the differential outputs of said light sensitive means to a minimum, and scalar means on said translating means for indicating the amount of parallel mismatch between said illuminated image and said partly transparent image.

6. An optical cross-correlator for indicating the amount of instantaneous parallel mismatch between a pair of films each bearing similar partly transparent film images and positioned in spaced parallel relation comprising, a planar light source positioned to transmit the light produced thereby through said pair of films, a collimating lens positioned between said light source and said pair of films whereby the illumination produced by each point on said planar light source is passed through the entire areas of said pair of films in parallel rays, a condensing lens means collecting the light transmitted through said films and focusing said light in a focal plane, a light receiving member including at least three light sensitive electrical means positioned in the focal plane of said condensing lens, means for translating said light receiving member in the focal plane of said condensing lens, servo means actuated by the differential outputs of said light sensitive means for actuating said translatory means in such direction as to reduce the differential outputs of said light sensitive means to a minimum, and scalar means on said translatory means for indicating the amount of parallel mismatch between said pair of film images.

References Cited in the file of this patent

UNITED STATES PATENTS

| | | |
|---|---|---|
| 493,426 | Edison | Mar. 14, 1893 |
| 1,135,919 | Pilkington | Apr. 13, 1915 |
| 1,747,664 | Droitcour | Feb. 18, 1930 |
| 1,958,612 | Dawson | May 15, 1934 |
| 2,354,108 | Fleming | July 18, 1944 |
| 2,406,451 | Borkenstein | Aug. 27, 1946 |
| 2,596,752 | Williams | May 13, 1952 |
| 2,646,717 | Selgin | July 28, 1953 |